United States Patent [19]

Love

[11] 4,227,844

[45] Oct. 14, 1980

[54] APPARATUS FOR LIFTING AND TRANSPORTING LARGE BALES OF MATERIAL

[76] Inventor: Phillip W. Love, P.O. Box 323, Smithville, Tenn. 37166

[21] Appl. No.: 3,984

[22] Filed: Jan. 16, 1979

[51] Int. Cl.³ .............................................. B60P 3/00
[52] U.S. Cl. ................................... 414/24.5; 414/459; 280/473
[58] Field of Search ............................... 414/459–461, 414/24.5; 294/107; 280/473

[56] References Cited

U.S. PATENT DOCUMENTS

| | | | |
|---|---|---|---|
| 2,862,635 | 12/1958 | Christenson et al. | 414/459 |
| 4,072,241 | 2/1978 | Parker et al. | 414/459 |
| 4,076,137 | 2/1978 | Kucera | 414/460 |

*Primary Examiner*—Stephen G. Kunin
*Assistant Examiner*—Lawrence E. Williams
*Attorney, Agent, or Firm*—Terry M. Crellin

[57] ABSTRACT

Apparatus is provided for handling one or more large bales of material. A mobile chassis forms a load-carrying chamber open at the rear end so that the chassis can be backed over one or more bales. A tongue is attached to the forward end of the chassis. The tongue is preferably attached to the chassis for between a position in which the motive vehicle and the chassis are in longitudinal alignment and a second position in which the motive vehicle is parallel with and laterally offset from the chassis, leaving the front of the chassis open to be pulled forward over one or more bales. A pair of load-lifting and supporting members are pivotally attached to the respective sides of the load-carrying chamber. Track members extend transversely across the top of the load-carrying chamber, with a pair of carriages adapted to move outwardly along the track members. Longitudinally expandable force members are connected between the carriages and the load-lifting structures. With the force members fully extended, the carriages are positioned adjacent the respective sides of the load-carrying chamber, and the force members extending downwardly to the load-lifting members. When the force members are shortened, the load-lifting members pivot outwardly and upwardly into their elevated, load supporting position, and the carriages move towards the center of the load-carrying chamber to maintain the force members in a substantially vertical position, thereby exerting maximum force on the load-lifting members.

6 Claims, 9 Drawing Figures

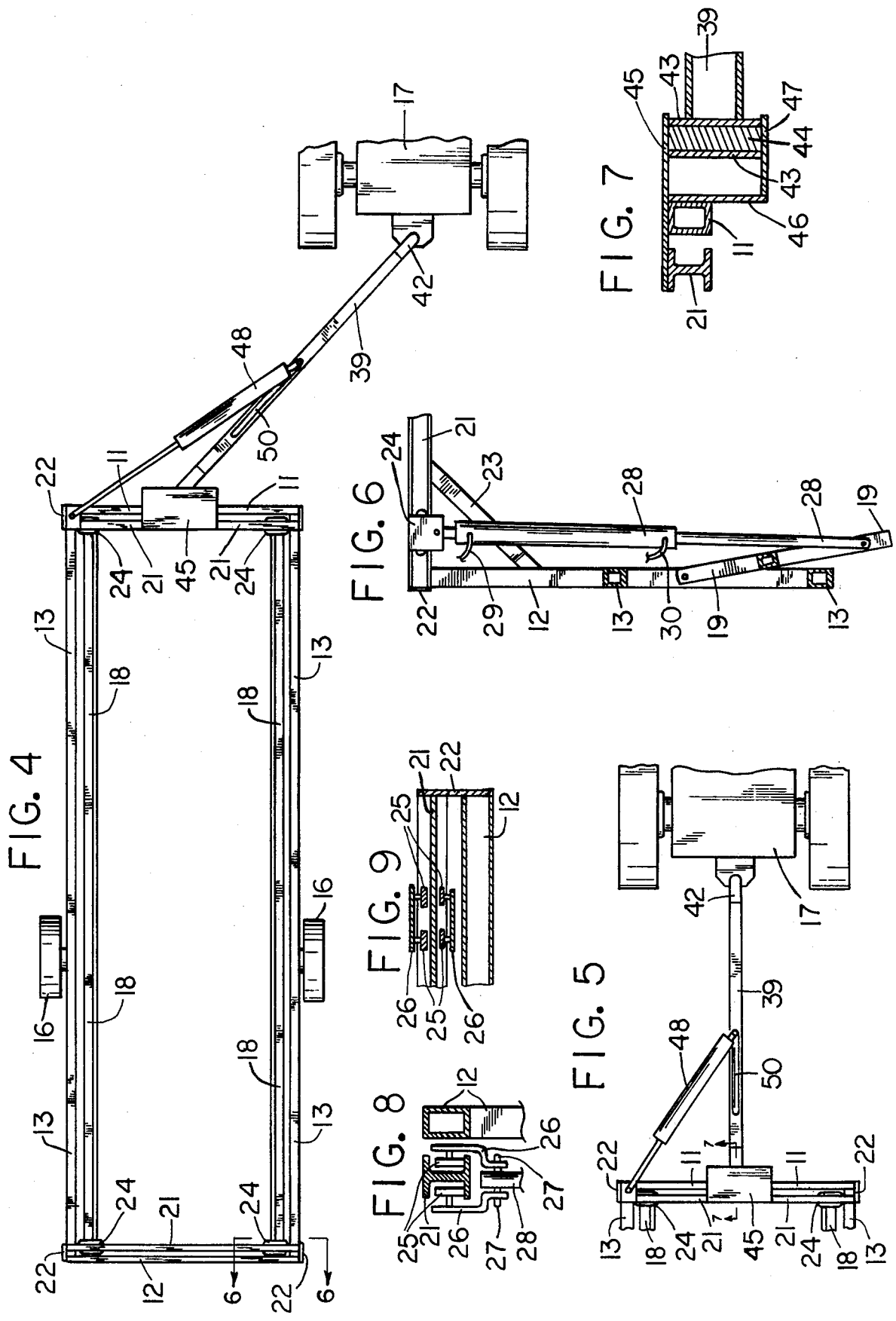

4,227,844

APPARATUS FOR LIFTING AND TRANSPORTING LARGE BALES OF MATERIAL

BACKGROUND OF THE INVENTION

1. Field:

The invention relates to apparatus for picking up and transporting large bales of material such as large cylindrically shaped bales of hay and the like.

2. State of the Art:

Various equipment is used for handling bales of material. Generally, the apparatus is used in combination with fork lift trucks or the like, and have been used mainly in warehouses. Representative apparatus is shown in U.S. Pat. Nos. 3,334,762; 3,876,093; and 3,929,366.

Recently, farm apparatus has been developed for producing large, cylindrical shaped bales of hay. These bales have a diameter of up to about 4 or 5 feet and a length of up to about 5 or 6 feet. In my earlier U.S. Pat. No. 4,053,069, issued Oct. 11, 1977, apparatus for lifting and moving one bale at a time is disclosed. In U.S. Pat. No. 4,072,241, apparatus for lifting and transporting two or more bales is disclosed. An object of the present invention is to provide improved apparatus which is simple and easy to use in picking up and moving one or more large bales of material, such as the large bales of hay.

SUMMARY OF THE INVENTION

The invention provides improved, economic apparatus for picking up and moving one or more large bales of material, such as big bales of hay having dimensions of up to about 4 or 5 feet by 5 or 6 feet.

The apparatus comprises a mobile chassis comprising inverted, substantially U-shaped members whose mutually respective legs are joined by elongate frame members to provide a load-carrying chamber defined by the frame members at its longitudinal sides and the inverted U-shaped members at the front and rear ends, respectively. A pair of wheels are mounted at the respective sides of the load-carrying chamber and means are provided for connecting the mobile chassis to a motive vehicle.

A pair of elongate, load-lifting structures are pivotally attached to respective sides of the load-carrying chamber. Each of the load-lifting structures comprises a lowermost elongate lift member extending substantially the length of an substantially parallel to the respective side of the load-carrying chamber. The lift members are pivotally attached to the respective sides of the load-carrying chamber by respective sets of arm members, so that the lift members can be moved in a swinging motion outwardly and upwardly from lowered positions adjacent to the lower sides of the load-carrying chamber to elevated positions extending outwardly from the respective sides and upwardly from the bottom of the load-carrying chamber and back to their lowered positions.

At least one track means is provided extending substantially transversely from the top of one of the sides to the top of the other side of the load-carrying chamber. Each track means has a pair of carriages associated therewith. The carriages are adapted to move outwardly along the track means from the respective sides of the load-carrying chamber. Longitudinally expandable force members are connected at mutually respective ends thereof to the respective carriages, with the mutually opposite ends being connected to respective load-lifting structures. When the force members are in their fully expanded position, the carriages are positioned adjacent to the respective sides of the load-carrying chamber, with the force members extending downwardly therefrom substantially alongside the respective sides of the load-carrying chamber. When the force members are shortened, the load-lifting structures move into their elevated position and the carriages move towards the center of the load-carrying chamber. As the carriages move inwardly, the expandable force members are maintained in substantially vertical position, thereby exerting maximum force on the load-lifting structure.

The expandable force means preferably comprise hydraulic cylinders capable of being extended or shortened by selective delivery of hydraulic fluid to opposite sides of the cylinder in which the piston moves. However, other force means are also contemplated. For example, the elongate connecting members could comprise threaded rods, and a motorized gear drive could be associated with each carriage so that the treaded rods could be moved to and fro along their longitudinal dimension with respect to the gear drives and carriages. In addition, the elongate connecting members could also be cables connected between a motorized drum on the carriages and the load-lifting structures. In the latter embodiment, cable would be wound on the drum to lift the load-lifting structures and unwound from the drum in lowering the structures to their lowered position.

In carrying out the moving of a bale of material, the apparatus is moved so that the bale of material is positioned longitudinally within the load-lifting chamber. As will be explained more fully in the following detailed description, the apparatus can be backed over a bale of material so that the bale enters the load-carrying chamber through the open back end of the apparatus, or in embodiments having a pivoting tongue, the apparatus can be moved forward with the bale entering the load-carrying chamber through the open front of the apparatus. The load-lifting structures are then moved inwardly and upwardly to lift the bale of material.

THE DRAWINGS

An embodiment representing the best mode presently contemplated of carrying out the invention is illustrated in the accompanying drawings in which:

FIG. 4 is a top plan view of the apparatus with the pivotal tongue member positioned so that the motive vehicle is offset from the apparatus leaving an open front end of the apparatus for moving forward over a bale of material;

FIG. 5 is a fragmentary top plan view showing the tongue member in its conventional position for transporting the bales of material;

FIG. 6 is a fragmentary transverse sectional view taken on line 6—6 of FIG. 4;

FIG. 7 is an enlarged cross-sectional view of the pivotal connection of the tongue member to the apparatus taken along line 7—7 of FIG. 5;

FIG. 8 is a fragmentary transverse section of the track means taken along line 8—8 of FIG. 3; and FIG. 9 is a fragmentary horizontal section along line 9—9 of FIG. 2.

DETAILED DESCRIPTION OF THE ILLUSTRATED EMBODIMENT

Figure 1:
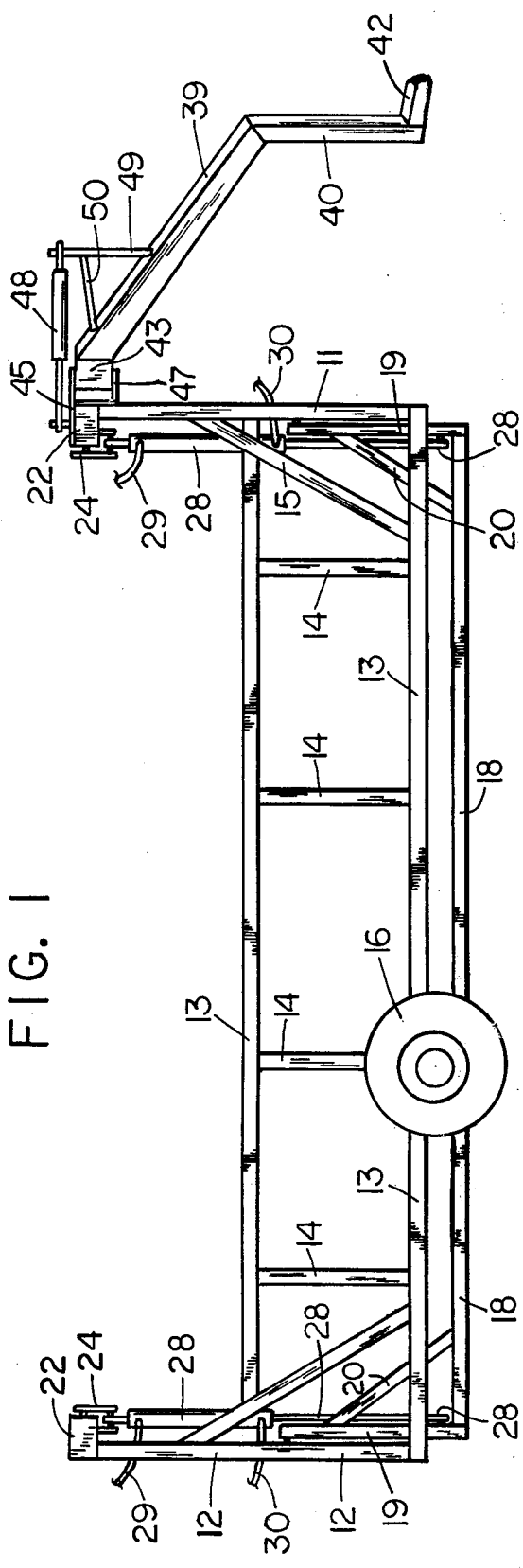
FIG. 1 is a side elevational view of apparatus in accordance with the present invention.

Referring to the drawings, the apparatus of the invention is shown as an agricultural vehicle for carrying and transporting large bales of hay. The vehicle includes a chassis comprising inverted, substantially U-shaped members 11 and 12 at the front and rear ends thereof, respectively. A pair of elongate frame members 13 are provided along the sides of the chassis, respectively, joining the mutual legs of the respective U-shaped members 11 and 12. A load-carrying chamber is defined by the frame members 13 at the sides of the chassis and the U-shaped members 11 and 12 at the front and rear end, respectively, of the chassis. Upstanding strut members 14 (FIG. 1) extend between the pair of frame members 13 on each side of the chassis to add strength to the sides of the chassis. In addition, diagonal members 15 (FIG. 1) extend between the lower frame members 13 at each side of the chassis to the respective front and rear U-shaped members 11 and 12.

The chassis is mobile and includes at least one wheel 16 rotatably mounted at each side of the chassis. A tongue member 39 is pivotally connected to the front end of one of the sides of the chassis, and, as will be more fully described hereinafter, the tongue 39 is movable between a conventional transporting position in longitudinal alignment with the chassis and a bale collecting position with the tongue extending outwardly from the front of the chassis to which it is attached. The free end of the tongue member 39 is adapted to be attached to ball connection on a motive vehicle such as a tractor 17 as shown or other vehicle such as a truck not shown.

Figure 3:
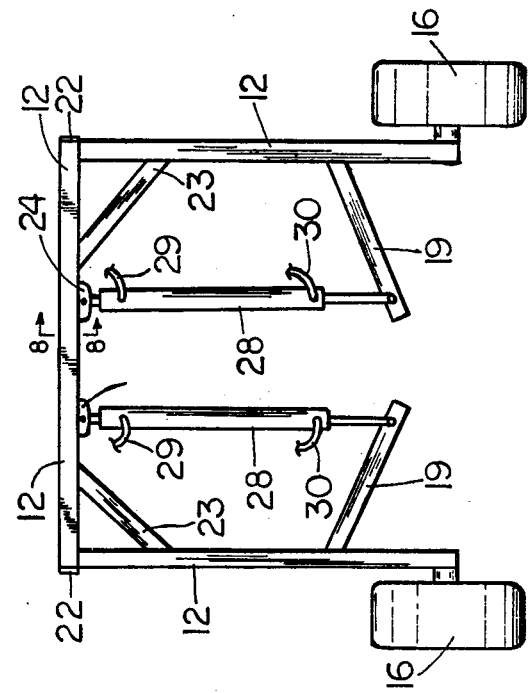
FIG. 3 is an end elevational view of the rear end of the apparatus shown in FIG. 1, with the load-lifting structures in their elevated position and with the tongue member at the front end of the apparatus not shown.

The apparatus includes a pair of elongate, load-lifting structures pivotally attached to respective sides of the load-carrying chamber. The load-lifting structures comprise lowermost elongate lift members 18 which extend substantially the length of and substantially parallel to the respective sides of the load-carrying chamber. Each of the lift members 18 is pivotally attached to a respective side of the load-carrying chamber by a set of arm members 19. As illustrated, the arm members 19 are attached at mutually respective ends to the respective ends of the lift members 18, and the other ends of the arm members are pivotally attached to the side members of the front and rear U-shaped members 11 and 12, respectively. A support brace 20 (FIG. 1) is attached between the respective arm members 19 and the elongate lift members 18 to provide added strength at the ends of the load-lifting structures. The lift members 18 are adapted for swinging motion outwardly and upwardly from lowered positions adjacent to the lower sides of the load-carrying chamber, as shown in FIGS. 1, 2, 4 and 6, to elevated positions extending outwardly from the respective sides and upwardly from the bottom of the load-carrying chamber, as shown in FIG. 3. As the lift members 18 swing outwardly and upwardly, they engage the underside of a bale, such as a bale of hay, and lift it off the ground.

Means are provided for moving the load-lifting structures between the lowered positions and the elevated, load-carrying positions. As best illustrated in FIGS. 4, 6, 8 and 9, track means 21 extend substantially transversely from the top of one of the sides to the top of the other side of the load-carrying chamber. The track means 21 illustrated in the drawings comprises two I-beams, extending across the load-carrying chamber, one adjacent to the rear U-shaped member and the other adjacent to the front U-shaped member. The respective I-beams are held in place by side plates 22 which are welded to the ends of the I-beams and the ends of the top members of the U-shaped members 11 and 12, respectively. The I-beams are spaced slightly from the top members of the U-shaped members for purposes to be explained hereinafter. Cross braces 23 are provided in the corners of the U-shaped members to add rigidity and strength thereto.

A pair of carriages, shown generally by the numeral 24 in FIGS. 1–6, are mounted on each of the I-beam track means 21. As shown clearly in FIGS. 8 and 9, each of the carriages comprises two pair of wheels 25, one pair on each side of the I-beam member 21 and adapted to roll along the lower flange of the I-beam member 21. The wheels 25 of each carriage have axles which extend outwardly in opposite directions from the I-beam members 21 and are attached to a pair of downwardly depending, opposed plates 26. As mentioned hereinbefore, the I-beam members 21 are spaced slightly from the top beams of the U-shaped members. The space between the I-beam members 21 and the U-shaped members 11 and 12 allow space for the side plates 26 of the carriages to move along the I-beam members 21. The space between the I-beam members 21 and the U-shaped members 11 and 12 need be only sufficient to allow movement of the carriages along the I-beam members 21. A tie pin 27 extends through the lower ends of plates 26 below the I-beam member 21, thus securing the carriage to the I-beam member 21 for longitudinal movement therealong.

In addition, the tie pin 27 of each carriage forms a pivot pin for attachment to the upper ends of respective expandable force members 28. The mutually opposite ends of the force members 28 are attached to the respective ends of the load-lifting structures. As illustrated, the expandable force members 28 extend downwardly from their respective carriages on the I-beam track means 21 with their lower ends being pivotally attached to the lower ends of the arm members 19 of the load-lifting structures. The force members 28 are adapted to be selectively elongated or shortened so that when in their fully extended positions, the force members 28 move the load-lifting to their lowered positions as shown in FIGS. 1, 2, 4, and 6. When the force members 28 are shortened, they force the load-lifting structures into their elevated position as shown in FIG. 3.

The action of the carriages 24 permits maximum lifting force to be maintained on the load-lifting structures to lift heavy, large bales of material. When the force members 28 are elongated to lower the load-lifting structures, the carriages automatically travel to positions adjacent to the respective sides of the load-carrying chamber as shown in FIGS. 1, 2, 4, and 6. In this position, the force members 28 are positioned substantially parallel to and alongside the respective sides of the load-carrying chamber. In this position, the apparatus of the invention is readily pulled forward or backed over the bale which is to be transported. The open end at either the front or the rear of the load-carrying chamber allows the apparatus to move over the bale so that the bale is positioned within the load-carrying chamber. With the force members 28 positioned alongside the sides of the load-carrying chamber, they present no obstruction in moving the apparatus over a bale, such as a large bale of hay. The bale is lifted from the ground by shortening the force members to swing the load-lifting structures into their elevated positions. As the respective lift members 18 swing outwardly from the sides of the load-carrying chamber, the carriages 24 automatically move toward the center of the load-carrying chamber so as to maintain the force members 28 in substantially vertical position, thereby exerting maximum force on the load-lifting structures.

As illustrated, the expandable force members 28 are hydraulically operated ram members. Hydraulic fluid is introduced under pressure to the top of the cylinder section of the rams through hydraulic lines 29 when the force members 28 are extended. When the force members 28 are shortened, the hydraulic fluid is introduced under pressure to the bottom of the cylinder section of the rams through hydraulic lines 30. The pressurized hydraulic fluid is supplied by conventional means associated with the tractor or other motive vehicle and is not shown in the drawings and not encompassed per se by the present invention.

In the illustrated embodiment, the tongue 39 has one end connected to the forward end of the chassis, with the opposite end adapted to be connected to a prime mover such as a tractor or truck. The tongue member 39 is generally triangularly shaped and includes an upper member pivotally mounted at one of its ends to the central, upper portion of the U-shaped member 11 so as to extend outwardly and downwardly therefrom. The other end of the tongue member 39 has a downwardly extending member 40 (FIGS. 1 and 2) connected thereto. The free end of member 40 is provided with a connecting means 42 which is adapted to be pivotally attached to the tractor or truck in any conventional manner. As illustrated, the end member 42 is adapted to be pivotally connected to a conventional ball member on a tractor or truck. The tongue can easily be adapted for connection to the fifth wheel on a truck by providing a shorter member 40, with the connecting means 42 adapted for connection to the fifth wheel. The tongue member 39 is movable between a position in which the apparatus and its prime mover to which it is attached are in longitudinal alignment and a second position in which the apparatus is laterally offset and parallel with the prime mover to which it is attached. The first position is shown in FIG. 5, and the second position is shown in FIG. 4, with the prime mover being shown as a tractor 17.

The end of the tongue member 39 which is pivotally attached to the chassis includes a tubular member 43 mounted coaxially around a pivot post 44 (FIG. 7) for pivotal movement of the tongue member 39 about the pivot post 44. The pivot post 44 is mounted in an upright position between an upper plate 45 which is attached to the top of the U-shaped member 11 and the I-beam 21. A vertical plate 46 is attached to the forward side of the U-shaped member 11, and a base plate 47 extends forwardly from plate 46 to form the base attachment for the pivot post 44.

Figure 2:
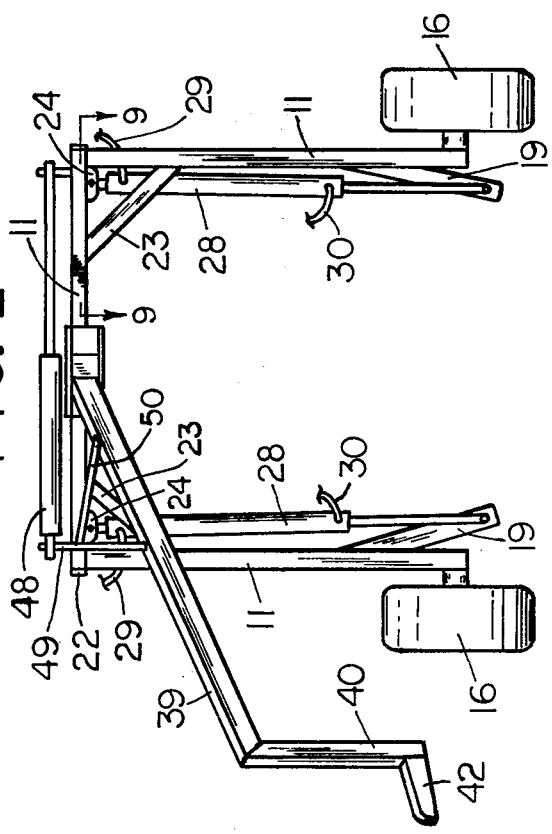
FIG. 2 is an end elevational view of the forward end of the apparatus shown in FIG. 1.

Means are provided for pivotally moving the tongue member 39 between a first position in which the leading end of the tongue member 39 extends forwardly from the load-carrying chamber with the hitch means being substantially aligned with the longitudinal center line of the load-carrying chamber, and a second position in which the leading end of the tongue member 39 is positioned outwardly from the side of the load-carrying chamber so that a motive vehicle to which the leading end of the tongue member is attached is substantially parallel to and offset from the side of the load-carrying chamber. As illustrated, a hydraulically operated ram 48 has one end thereof attached to one of the front corners of the load-carrying chamber. The other end of the ram 48 is attached to an upwardly extending post 49 which is mounted intermediate the ends of the tongue member 39. A brace 50 adds support to the post 49. When the ram is shortened to its minimum length, the tongue member 39 assumes its first position as illustrated in FIG. 5. When the ram is extended to its maximum length, the tongue member 39 moves to its second position as shown in FIGS. 2 and 4.

In using the apparatus as illustrated and described for picking up and moving one or more bales of material such as large bales of hay, the apparatus is moved over the bale of material so that the bale enters the load-carrying chamber through either the open front or rear end of apparatus. In positioning the apparatus over the bale of material, the longitudinal axis of the apparatus is aligned with the axis of the bale of the material, with the bale at either the front or back of the apparatus. The apparatus is then either backed or moved forward over the bale of material. When the bale of material is positioned in the load-carrying chamber, the expandable force members 28 are shortened thereby raising the load lifting structures. As the load lifting structures are raised, the carriages 24 move from the sides of the respective sides of the apparatus toward the longitudinal axis thereof as explained hereinbefore.

When the apparatus is to be moved forward over the bale which is to be picked up, the tongue member 39 is positioned in its second position as shown in FIG. 4 with the prime mover, such as a tractor 17, being laterally offset from the apparatus. With the tongue member 39 in its first position as shown in FIG. 5, the prime mover 17 is in longitudinal alignment with the apparatus, and the apparatus can be pulled forward, such as for transporting bales of material which have been picked up, or the apparatus can be backed over a bale material for subsequent picking the bale up from the ground.

When picking up multiple bales of material, the first one is positioned in the load-carrying chamber next to either the front or rear end thereof. The bale is lifted, and the apparatus moved to the next bale to be picked up. The apparatus is positioned so that the second bale is positioned at the end of the apparatus adjacent the first or previously pick-up bale. The expandable members 28 are lengthened so as to lower the previously pick-up bale of material to the ground adjacent to the second bale of material. The apparatus is then moved over the two bales of material so that the second bale is positioned next to either the front or rear end of the apparatus. Both bales are picked up by again shortening of the expandable force members 28 so as to move the load-lifting structures into their elevated positions. Subsequent bales are picked up by repeating the process in a similar manner until the load-carrying chamber has been filled. The bales may then be moved along a road or highway to wherever they are to be stored or otherwise used.

It is to be understood that various modifications can be made to the embodiment of the apparatus shown in the drawings without departing from the novel features of the invention as particularly pointed out in the claims which follow.

I claim:

1. Apparatus for picking up and transporting one or more large bales of material, such as large cylindrical bales of hay, said apparatus comprising inverted, substantially U-shaped members; elongate frame members joining the mutual legs of the respective U-shaped members to provide a load-carrying chamber defined by the frame members at the respective sides, and the U-shaped members at the front and rear ends, respectively; a pair of wheels mounted at the respective sides of the load carrying chamber; means for connecting the apparatus to a motive vehicle; a pair of elongate, load-lifting structures pivotally attached to respective sides of the load-carrying chamber, said load-lifting structures comprising respective lowermost elongate lift members extending substantially the length of and substantially parallel to the respective sides of the load-carrying chamber, said lift members being pivotally attached to the respective sides of the load-carrying chamber by respective sets of arm members, so that the lift members can be moved in a swinging motion outwardly and upwardly from lowered positions adjacent to the lower sides of the load-carrying chamber to elevated positions extending outwardly from the respective sides and upwardly from the bottom of the load-carrying chamber and back to the lowered positions; at least one track means extending substantially transversely from the top of one of the sides to the top of the other side of the load-carrying chamber; a pair of carriages for each track means, said carriages being adapted to move outwardly along the track means from the respective sides of the load-carrying chamber; longitudinally expandable force members connected at mutually respective ends thereof to the respective carriages, with the mutually opposite ends of the expandable force members being connected to the respective load-lifting structures, whereby when the expandable force members are in their fully extended position, the carriages are positioned adjacent to the respective sides of the load-carrying chamber with the force members extending downwardly therefrom substantially alongside the respective sides of the load-carrying chamber, and when the expandable force members are shortened, the load-lifting structures move into their elevated position and the carriages move toward the center of the load-carrying chamber so as to maintain the expandable force members in substantially vertical position, thereby exerting maximum force on the load-lifting structure.

2. Apparatus in accordance with claim 1, wherein the means for connecting the apparatus to the motive vehicle includes a tongue member connected to the forward end of the load-carrying chamber, said tongue member having hitch means adapted to be attached to a motive vehicle.

3. Apparatus in accordance with claim 2, wherein the tongue member is pivotally attached to the load-carrying chamber and means are provided for pivotally moving said tongue member between a first position with the leading end of the tongue member extending forwardly from the load-carrying chamber with the hitch means substantially aligned with the longitudinal center line of the load-carrying chamber, and a second position with the leading end of the tongue member positioned outwardly from the side of the load-carrying so that the motive vehicle to which the leading end of the tongue member is attached is substantially parallel to and offset from the side of the load-carrying chamber.

4. Apparatus in accordance with claim 3, wherein the means for pivotally moving the tongue member comprises a hydraulically operated ram connected between the tongue member and the load-carrying chamber.

5. Apparatus in accordance with claim 1, wherein two track means are provided, one at the front end of the load-carrying chamber and the other at the rear end of the load-carrying chamber.

6. Apparatus in accordance with claim 1, wherein the expandable force members comprise hydraulically operated ram members.

* * * * *